US012726065B2

(12) United States Patent
Yao et al.

(10) Patent No.: US 12,726,065 B2
(45) Date of Patent: Sep. 1, 2026

(54) STATOR STRUCTURE, MOTOR, AND ELECTRICAL EQUIPMENT

(71) Applicants: WELLING (WUHU) MOTOR MANUFACTURING CO., LTD., Wuhu (CN); MIDEA WELLING MOTOR TECHNOLOGY (SHANGHAI) CO., LTD., Shanghai (CN)

(72) Inventors: Shuchun Yao, Wuhu (CN); Wenrui Li, Wuhu (CN); Yajun Zuo, Wuhu (CN)

(73) Assignees: Welling (Wuhu) Motor Manufacturing Co., Ltd., Wuhu (CN); Midea Welling Motor Technology (Shanghai) Co., Ltd., Shanghai (CN)

( * ) Notice: Subject to any disclaimer, the term of this patent is extended or adjusted under 35 U.S.C. 154(b) by 203 days.

(21) Appl. No.: 18/676,856

(22) Filed: May 29, 2024

(65) Prior Publication Data

US 2024/0313597 A1 Sep. 19, 2024

Related U.S. Application Data

(63) Continuation of application No. PCT/CN2022/078864, filed on Mar. 2, 2022.

(30) Foreign Application Priority Data

Dec. 3, 2021 (CN) ......................... 202111469930.8
Dec. 3, 2021 (CN) ......................... 202123022611.0

(51) Int. Cl.

| | |
|---|---|
| ***H02K 3/18*** | (2006.01) |
| ***H02K 1/14*** | (2006.01) |
| ***H02K 3/32*** | (2006.01) |

(52) U.S. Cl.
CPC ............... *H02K 3/18* (2013.01); *H02K 1/146* (2013.01); *H02K 3/325* (2013.01)

(58) Field of Classification Search
CPC .......... H02K 3/18; H02K 1/146; H02K 3/325; H02K 1/14; H02K 1/16; H02K 3/12; H02K 3/28; H02K 3/34; H02K 3/52
See application file for complete search history.

(56) References Cited

U.S. PATENT DOCUMENTS

2005/0236921 A1 10/2005 Yoneda et al.
2009/0072653 A1 * 3/2009 Harada .................... H02K 3/18 29/596

(Continued)

FOREIGN PATENT DOCUMENTS

CN 203942340 U 11/2014
CN 109818444 A 5/2019

(Continued)

OTHER PUBLICATIONS

First Office Action dated Jan. 20, 2025 for Chinese Patent Application No. 202111469930.8.

(Continued)

*Primary Examiner* — Thomas Truong
(74) *Attorney, Agent, or Firm* — Anova Law Group, PLLC

(57) ABSTRACT

A stator structure, a motor, and electrical equipment are provided. The stator structure includes a stator core that includes a stator yoke and multiple stator teeth. The stator teeth are arranged on the stator yoke. A stator slot is formed between two adjacent stator teeth. Each stator tooth includes a tooth body and a tooth boot. The tooth body is arranged on the stator yoke. The tooth boot is arranged on the tooth body. The stator structure further includes a winding arranged on the stator teeth. The winding includes flat wires wound on the stator teeth in a concentrated manner. The flat wires is (Continued)

wound on the stator teeth in multiple layers. The number of flat wires in the layer of the winding away from the stator teeth is not more than the number of flat wires in the layer of the winding close to the stator teeth.

18 Claims, 6 Drawing Sheets

(56) References Cited

U.S. PATENT DOCUMENTS

| | | | | |
|---|---|---|---|---|
| 2010/0295390 A1* | 11/2010 | Rau | H02K 1/165 310/216.069 |
| 2013/0106232 A1* | 5/2013 | Kobayashi | H02K 15/095 310/208 |
| 2022/0407371 A1* | 12/2022 | Ohsugi | H02K 15/021 |
| 2024/0305155 A1* | 9/2024 | Tsukamoto | H02K 3/345 |

FOREIGN PATENT DOCUMENTS

| | | | |
|---|---|---|---|
| CN | 110266126 | A | 9/2019 |
| CN | 110768404 | A | 2/2020 |
| CN | 216356119 | U | 4/2022 |
| DE | 102012022868 | A1 | 5/2014 |
| EP | 3319208 | A1 | 5/2018 |
| FR | 2830994 | A1 | 4/2003 |
| JP | 2008131811 | A | 6/2008 |
| WO | 2021134387 | A1 | 7/2021 |

OTHER PUBLICATIONS

International Search Report dated Aug. 9, 2022 issued in PCT/CN2022/078864.

Extended European search report dated Mar. 19, 2025 for European Patent Application No. 22899735.9.

Duane Hanselman: Chapter 10, Brushless Permanent Magnet Motor Design, Jan. 1, 2006, Magna Physics Publishing ISBN 978-1-881855-15-6.

* cited by examiner

STATOR STRUCTURE, MOTOR, AND ELECTRICAL EQUIPMENT

CROSS-REFERENCE TO RELATED APPLICATIONS

This application is a continuation application of International Application No. PCT/CN2022/078864 filed on Mar. 2, 2022, which claims priority to Chinese Patent Application No. 202111469930.8 filed on Dec. 3, 2021 and Chinese Patent Application No. 202123022611.0 filed on Dec. 3, 2021, the entire contents of each of which are incorporated herein by reference for all purposes. No new matter has been introduced.

FIELD

The present disclosure relates to the field of motors, and particularly relates to a stator structure, a motor, and electrical equipment.

BACKGROUND

In the related art, the stator winding of a motor can be wound by adopting flat wires, however, common flat wire winding motors often use distributed windings and parallel slot structures, and require relatively complex winding equipment, although a concentrated winding facilitates automatic winding, its slot fill factor is relatively low. Thus, how to improve the slot fill factor in the case of facilitating the winding has become a problem that needs to be solved urgently.

SUMMARY

The present disclosure aims to solve at least one of the problems in the prior art.

In view of this, the first aspect of the present disclosure provides a stator structure.

The second aspect of the present disclosure provides a motor.

The third aspect of the present disclosure provides electrical equipment.

Thus, according to the first aspect of the present disclosure, the present disclosure provides a stator structure, including: a stator core and a winding. The stator core includes a stator yoke and a plurality of stator teeth, the plurality of stator teeth are arranged on the stator yoke, a stator slot is formed between adjacent stator teeth, each stator tooth includes a tooth body and a tooth boot, the tooth body is arranged on the stator yoke, and the tooth boot is arranged on the tooth body. The winding is arranged on the stator teeth, and the winding includes flat wires wound on the stator teeth in a concentrated manner, the flat wires are wound on the stator teeth in multiple layers, and the number of flat wires in the layer of the winding away from the stator teeth is not more than the number of flat wires in the layer of the winding close to the stator teeth, and the width of the side of the tooth body close to the tooth boot is $2\times t1$, the width of the side of the tooth body close to the stator yoke is $2\times t2$, and $1.5\times t1\geq t2\geq t1$.

The stator structure provided by the present disclosure includes the stator core and the winding, and the stator core includes the stator yoke and a plurality of stator teeth provided on the stator yoke, the stator slot is formed between adjacent stator teeth; while the winding includes the flat wires, the flat wires are wound on the stator teeth to form the winding, and the flat wires are wound in a concentrated manner, and the flat wires on the same stator tooth are more regular, and this helps improve the slot fill factor, and in addition, the flat wires are wound on the stator teeth in multiple layers; and, the number of the flat wires in the layer of the winding away from the stator teeth is not more than the number of flat wires in the layer of the winding close to the stator teeth, and furthermore, the length of the end of the winding away from the stator teeth in the radial direction of the stator core will be smaller than the length of the end of the winding close to the stator teeth in the radial direction of the stator core, and then, the winding wound on one stator tooth within one stator slot forms a structure similar to a triangle, and this can further reduce the probability of intersection of the windings on two different stator teeth; under the same circumstance, one stator slot can accommodate more flat wires, to improve the slot fill factor of the stator core and improving the efficiency of the motor.

In addition, a stator tooth includes the tooth body arranged on the stator yoke, and the tooth boot arranged on the tooth body. That is, the stator tooth incudes the tooth body and the tooth boot arranged at the end of the tooth body, and furthermore, the winding can be provided on the tooth body, and the air-gap of the motor is improved through the tooth boot.

Furthermore, the width of the side of the tooth body close to the tooth boot is $2\times t1$, the width of the side of the tooth body close to the stator yoke is $2\times t2$, and $1.5\times t1\geq t2\geq t1$.

That is, the width of the side of the tooth body close to the tooth boot is $2\times t1$, the width of the side of the tooth body close to the stator yoke is $2\times t2$, 1.5 times of t1 which is half of the width of the side of the tooth body close to the tooth boot is greater than or equal to t2 which is half of the width of the side of the tooth body close to the stator yoke, t2 which is half of the width of the side of the tooth body close to the stator yoke is greater than or equal to t1 which is half of the width of the side of the tooth body close to the tooth boot, and thus, the angle between two side walls of the stator slot is appropriate, and this helps increase the area of the cross section of the stator slot and helps accommodate more flat wires.

In addition, adopting the form of concentrated winding facilitates the automatic winding of the flat wires, and through limiting the size of the stator teeth, the slot fill factor of the flat wires is improved, and both economic cost and motor performance are considered.

In addition, the stator structure in the above embodiment provided by the present disclosure can further have the following additional features.

On the basis of the above embodiment, furthermore, the stator yoke faces one side of the stator teeth, and the portion between adjacent stator teeth is the bottom wall of the stator slot, the side of the stator teeth facing the stator slot is the side wall of the stator slot, and, the length of the cross section of the flat wire is x, the width thereof is y, the linear distance between the ends of the two side walls facing the bottom wall is n, the linear distance between the ends of the two side walls away from the bottom wall is m, and along the radial direction of the stator core, the distance between the two ends of the side wall is h, and $0.25\times h\div m<x\div y<6\times h\div n$.

In the embodiment, the stator slot is enclosed by the stator yoke and two adjacent stator teeth, that is, the portion of the stator yoke located between the two adjacent stator teeth is the bottom wall of the stator slot between the two adjacent stator teeth, and the stator slot is enclosed by the stator yoke and two adjacent stator teeth, i.e., the portion of the stator yoke located between the two adjacent stator teeth is the bottom wall of the stator slot between the two adjacent stator teeth, and the side wall of one stator tooth is the side wall at one side of the stator slot, and the side wall of the other stator tooth is the side wall at the other side of the stator slot; in addition, the length of the cross section of the flat wire is x, the width of the cross section of the flat wire is y, the linear distance between the ends of the two side walls facing the bottom wall is n, the linear distance between the ends of the two side walls away from the bottom wall is m, and along the radial direction of the stator core, the distance between the two ends of the side wall is h, and they satisfy $0.25\times h\div m<x\div y<6\times h\div n$, and furthermore, the cross-section of the stator slot can be regarded as a trapezoid, and then the upper line, lower line, and height of the trapezoid are set and the relation between them and the length and the width of the flat wire is defined, and the waste of internal space in the stator slot can be minimized as much as possible, and the slot fill factor of the stator slot can be improved as much as possible.

On the basis of any of the above embodiments, furthermore, along the radial direction of the stator core, adjacent flat wires fit each other.

In the embodiment, along the radial direction of the stator core, adjacent flat wires fit each other, and then the distance between the flat wires is zero, and thus the number of the flat wires that the stator slot can accommodate is increased, and the slot fill factor of the stator core is improved.

On the basis of any of the above embodiments, furthermore, along the circumferential direction of the stator core, adjacent flat wires fit each other.

In the embodiment, along the circumferential direction of the stator core, the adjacent flat wires fit each other, and furthermore, the distance between the flat wires is zero, and thus the number of the flat wires that the stator slot can accommodate is increased, and the slot fill factor of the stator core is improved.

On the basis of any of the above embodiments, furthermore, the stator tooth is a trapezoid stator tooth or a parallel stator tooth.

In the embodiment, the stator tooth can adopt the trapezoid stator tooth or the parallel stator tooth.

On the basis of any of the above embodiments, furthermore, the bottom wall is a plane, a curved surface, a combination of a plurality of planes, a combination of a plurality of curved surfaces or a combination of a plurality of curved surfaces and planes.

In the embodiment, the slot bottom of the stator tooth can be a plane structure, a curved surface structure, a structure of the combination of a plurality of planes, a structure of the combination of a plurality of curved surfaces or a structure of the combination of a plurality of planes and curved surfaces.

On the basis of any of the above embodiments, furthermore, the bottom wall is a plane, the angle between the bottom wall and the side wall is $\beta\geq\pi\div2-\pi\div Z1$, and Z1 is the number of the stator teeth.

In the embodiment, the angle between the bottom wall and the side wall is $\beta\geq\pi\div2-\pi\div Z1$, and furthermore, a relatively large angle is formed between the bottom wall and the side wall of the stator slot, and thus the area of the cross section of the stator slot is improved, the number of the flat wires that the stator slot can accommodate is increased, and the efficiency of the motor is improved.

On the basis of any of the above embodiments, furthermore, the bottom wall is a curved surface, the angle between the side wall and the tangent to the bottom wall passing through any intersection of the bottom wall and the side wall is $\beta\geq\pi\div2-\pi\div Z1$, and Z1 is the number of the stator teeth.

In the embodiment, the angle between the side wall and the tangent to the bottom wall passing through any intersection of the bottom wall and the side wall is $\beta\geq\pi\div2-\pi\div Z1$, and furthermore, a relatively large angle is formed between the bottom wall and the side wall of the stator slot, and thus the area of the cross section of the stator slot is improved, the number of the flat wires that the stator slot can accommodate is increased, and the efficiency of the motor is improved.

On the basis of any of the above embodiments, furthermore, the numbers of the flat wires in different windings within the same stator slot are the same.

In the embodiment, one stator slot needs to accommodate the windings on two stator teeth, and furthermore, the numbers of the flat wires in different windings within the same stator slot are the same, and one stator slot can be divided equally by different windings, then the numbers of the flat wires in each of the windings are the same, and then the magnetic field formed by the stator structure is more uniform, and the number of the flat wires of each winding can be maximized.

On the basis of any of the above embodiments, furthermore, an insulation piece is provided between the stator core and the winding.

In the embodiment, the insulation piece is provided between the stator core and the winding, and the current is concentrated in the winding, and thus it is lessened that the stator core absorbs current and then affects a magnetic field environment.

On the basis of any of the above embodiments, furthermore, the flat wire includes: a wire; and an insulation layer provided on the outside of the wire.

In the embodiment, the flat wire includes the wire and the insulation layer provided on the outside the of wire, the insulation layer makes the flat wires conduct electricity only in the direction of winding, and furthermore, this helps realize electromagnetic induction and improve the intensity of the magnetic field.

According to the second aspect of the present disclosure, the present disclosure provides a motor, including: a rotor structure; and the stator structure provided in any of the above embodiments.

The motor provided by the present disclosure includes the stator structure provided in any of the above embodiments, and thus has all the beneficial effects of the stator structure of any of the above embodiments, which are not stated herein one by one.

According to the third aspect of the present disclosure, the present disclosure provides electrical equipment, including the motor provided in any of the above embodiments.

The electrical equipment provided by the present disclosure includes the motor provided in any of the above embodiments, and thus has all the beneficial effects of the motor of any of the above embodiments, which are not stated here one by one.

The additional aspects and advantages of the present disclosure will be obvious in the following description, or can be understood through the implementation of the present disclosure.

BRIEF DESCRIPTION OF THE DRAWINGS

The above and/or additional aspects and advantages of the present disclosure will be obvious and understood easily from the following description of the embodiments in combination with the accompanying drawings. And, FIG. 1 is a schematic view of the structure of a stator structure according to an embodiment of the present disclosure.

Figure 1:
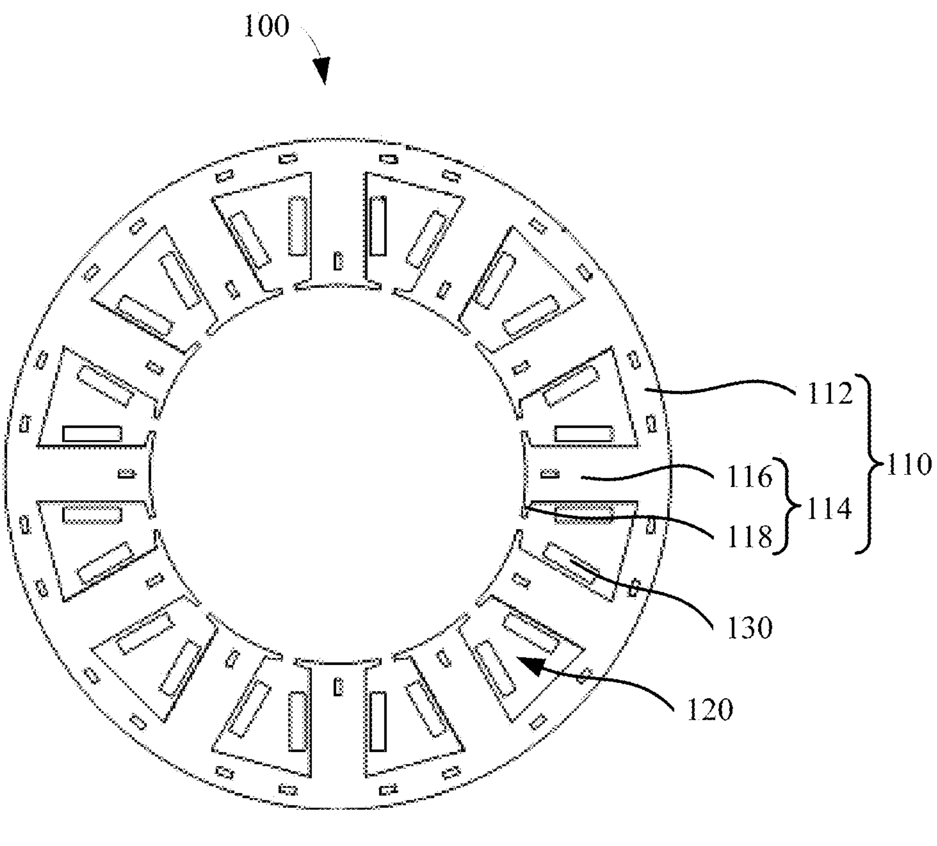

The corresponding relationships between the reference signs and the component names in FIG. 1 to FIG. 10 are as follows:

100: stator structure, 110: stator core, 112: stator yoke, 114: stator tooth, 116: tooth body, 118: tooth boot, 120: stator slot, 122: bottom wall, 124: first side wall, 126: second side wall, 130: winding, 132: flat wire, 134: wire, 136: insulation layer, 140: insulation piece.

DETAILED DESCRIPTION OF THE DISCLOSURE

To more clearly understand the above purposes, features and advantages of the present disclosure, the present disclosure will be further detailed hereinafter in combination with the accompanying drawings and embodiments. It should be indicated that in the case of no conflict, the embodiments and the features in the embodiments of the present disclosure can be combined with each other.

Many details are illustrated in the following description for the convenience of a thorough understanding to the present disclosure, but the present disclosure can also be implemented using other embodiments other than these described herein. Therefore, the protection scope of the present disclosure is not limited to the embodiments disclosed in the following text.

A stator structure 100, a motor and electrical equipment according to some embodiments of the present disclosure are described in the following by referring to FIG. 1 to FIG. 11.

As shown in FIG. 1, FIG. 2, FIG. 4, FIG. 5, FIG. 6, FIG. 7, FIG. 8, FIG. 9 and FIG. 10, the present disclosure provides a stator structure 100, comprising a stator core 110 and a winding 130 wound on the stator core 110, and the winding 130 is wound in a concentrated manner; the stator core 110 comprises a stator slot 120 and a plurality of stator teeth 114; a stator yoke 112 is in a ring shape, a plurality of stator teeth 114 are arranged spaced apart in the inner ring of the stator yoke 112, and the stator slot 120 is formed between adjacent stator teeth 114; the winding 130 is wound on the stator teeth 114, and a portion thereof is located in the stator slot 120; and, the winding 130 adopts flat wires 132, multiple layers of flat wires 132 are wound on each stator tooth 114, the multiple layers of flat wires 132 are arranged from the stator tooth 114 towards the outside, and the number of the flat wires 132 of the layer close to the stator tooth 114 is not less than the number of the flat wires 132 of the layer away from the stator tooth 114.

The stator structure 100 provided by the present disclosure comprises the stator core 110 and the winding 130, and, the stator core 110 comprises the stator yoke 112 and a plurality of stator teeth 114 provided on the stator yoke 112, the stator slot 120 is formed between adjacent stator teeth 114; while the winding 130 comprises the flat wires 132, the flat wires 132 are wound on the stator teeth 114 to form the winding 130, and the flat wires 132 are wound in a concentrated manner, and the flat wires 132 on the same stator tooth 114 are more regular, and this helps improve the slot fill factor, and in addition, the flat wires 132 are wound on the stator teeth 114 in multiple layers; and, the number of the flat wires 132 in the layer of the winding 130 away from the stator teeth 114 is not more than the number of flat wires 132 in the layer of the winding 130 close to the stator teeth 114, and furthermore, the length of the end of the winding 130 away from the stator teeth 114 in the radial direction of the stator core 110 will be smaller than the length of the end of the winding 130 close to the stator teeth 114 in the radial direction of the stator core 110, and then, the winding 130 wound on one stator tooth 114 within one stator slot 120 forms a structure similar to a triangle, and this can further reduce the probability of intersection of the windings 130 on two different stator teeth 114; under the same circumstance, one stator slot 120 can accommodate more flat wires 132, to improve the slot fill factor of the stator core 110 and improving the efficiency of the motor.

In the embodiment, the flat wire 132 is a wire with a rectangular cross section, and the sizes of each of the cross sections of the flat wire 132 are consistent.

Figure 2:
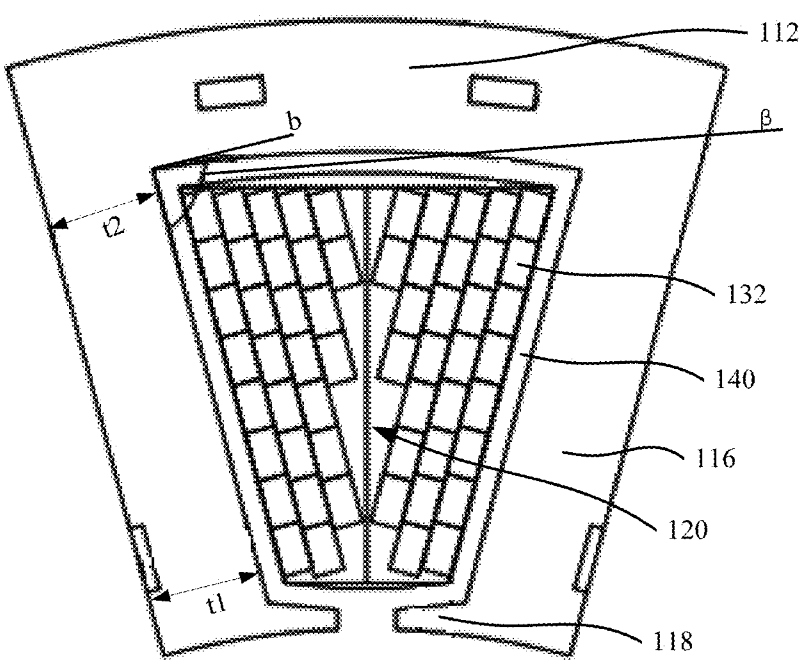
FIG. 2 is a schematic view of a part of the structure of the stator structure.
Figure 10:
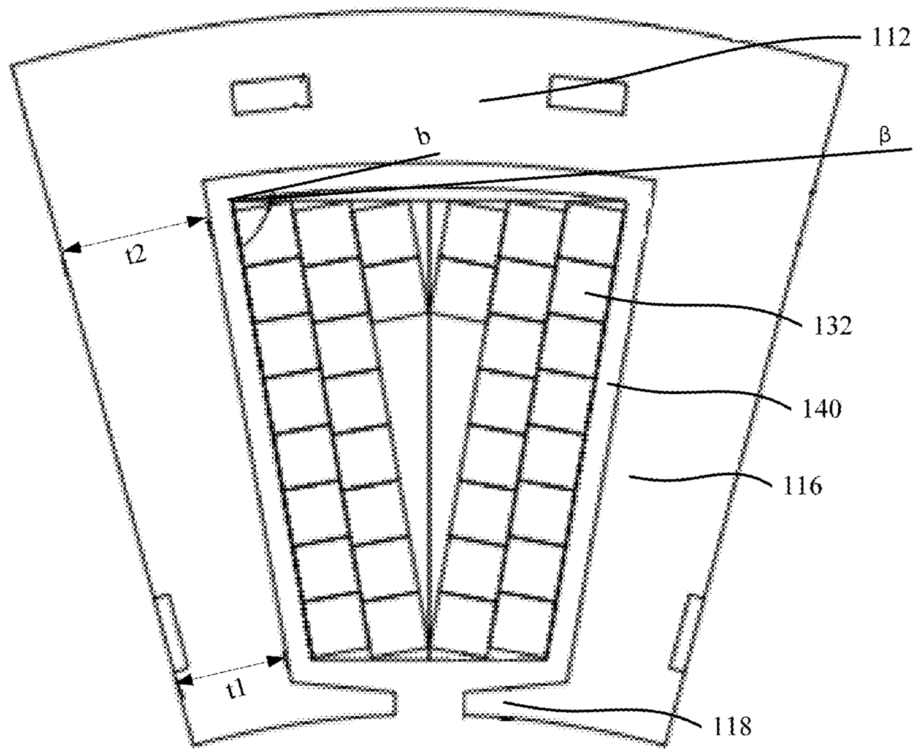
FIG. 10 is a schematic view of a part of the structure of the stator structure.

As shown in FIG. 1, FIG. 2 and FIG. 10, furthermore, the stator tooth 114 comprises a tooth body 116 and a tooth boot 118, and one end of the tooth body 116 is connected to the stator yoke 112, and the other end is connected to the tooth boot 118.

In the embodiment, the stator tooth 114 comprises the tooth body 116 and the tooth boot 118 arranged at the end of the tooth body 116, and furthermore, the winding 130 can be provided on the tooth body 116, and the air-gap of the motor is improved through the tooth boot 118.

Furthermore, as shown in FIG. 2 and FIG. 10, the width of the side of the tooth body 116 close to the tooth boot 118 is $2 \times t1$, the width of the side of the tooth body 116 close to the stator yoke 112 is $2 \times t2$, and $1.5 \times t1 \geq t2 \geq t1$.

In the embodiment, the width of the side of the tooth body 116 close to the tooth boot 118 is $2 \times t1$, the width of the side of the tooth body 116 close to the stator yoke 112 is $2 \times t2$, 1.5 times of t1 which is half of the width of the side of the tooth body 116 close to the tooth boot 118 is greater than or equal to t2 which is half of the width of the side of the tooth body 116 close to the stator yoke 112, t2 which is half of the width of the side of the tooth body 116 close to the stator yoke 112 is greater than or equal to t1 which is half of the width of the side of the tooth body 116 close to the tooth boot 118, and thus, the angle between two side walls of the stator slot 120 is appropriate, and this helps increase the area of the cross section of the stator slot 120 and helps accommodate more flat wires 132.

As shown in FIG. 2 and FIG. 10, one stator slot 120 is enclosed by a portion of the stator yoke 112 and two adjacent stator teeth 114; FIG. 2 and FIG. 10 show a complete stator slot 120, a portion of the stator yoke 112, and half of each of the two stator teeth 114 adjacent to the two sides of the stator slot 120, and therefore, in FIG. 2 and FIG. 10, t2 of the stator tooth 114 is half of the width of the side of the tooth body 116 close to the stator yoke 112, and t1 is half of the width of the side of the tooth body 116 close to the tooth boot 118.

Through the arrangement of $1.5\times t1 \geq t2 \geq t1$, it can be ensured that 3 is within a certain range, to prevent an excessively low accommodation capability of the stator slot 120, and in the radial direction of the stator core 110, the stator slot 120 also has a certain length, and thus can accommodate more flat wires 132.

In an embodiment, t1=5 mm, then 7.5 mm≥t2≥5 mm, t1=4 mm, and then, 6 mm≥t2≥4 mm, and the above is only an illustration of the distance; the values of t1 and t2 in the present disclosure can be any numeric values satisfying the formula of $1.5\times t1 \geq t2 \geq t1$.

In addition, adopting the form of concentrated winding facilitates the automatic winding of the flat wires 132, and through limiting the size of the stator tooth 114, the slot fill factor of the flat wires 132 is improved, and both economic cost and motor performance are considered.

Figure 5:
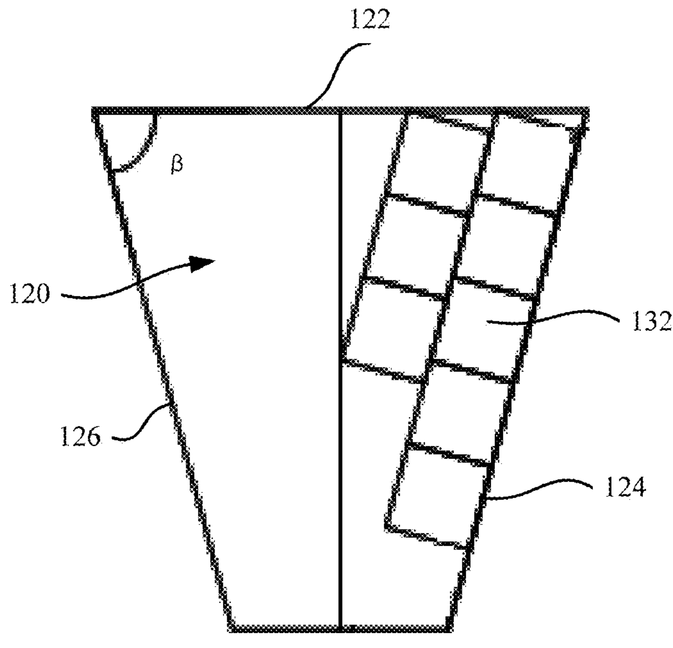
FIG. 5 is a schematic view of a part of the structure of the stator structure.
Figure 8:
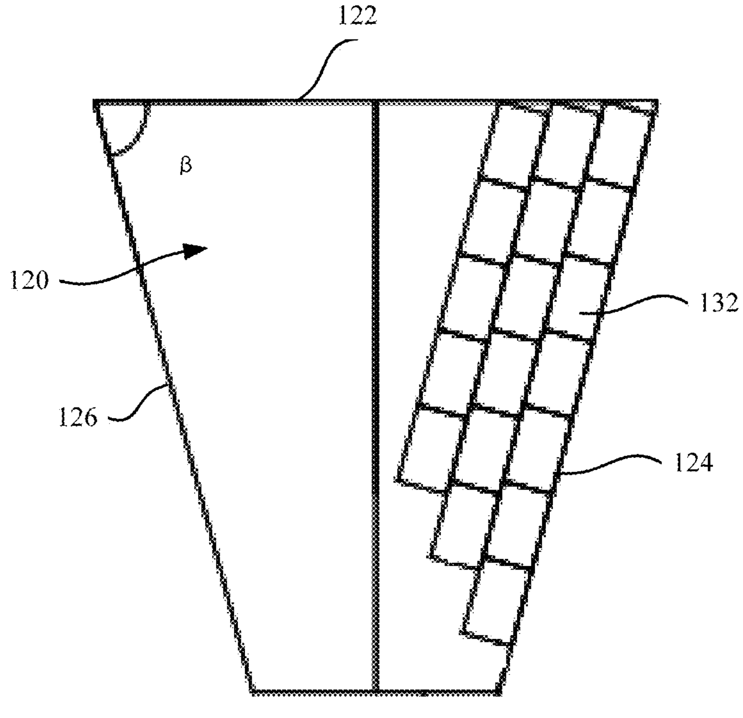
FIG. 8 is a schematic view of a part of the structure of the stator structure.
Figure 9:
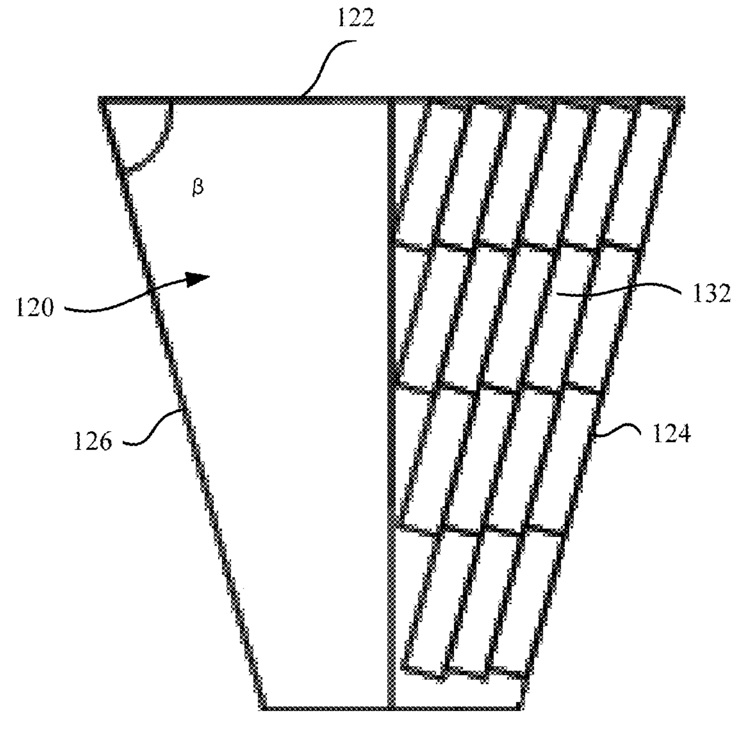
FIG. 9 is a schematic view of a part of the structure of the stator structure.

As shown in FIG. 5, FIG. 8 and FIG. 9, on the basis of the previous embodiment, furthermore, the stator yoke 112 faces one side of the stator teeth 114, and the portion between adjacent stator teeth 114 is the bottom wall 122 of the stator slot 120, the side of the stator teeth 114 at one side facing the stator slot 120 is a first side wall 124 of the stator slot 120, the side of the stator teeth 114 at the other side facing the stator slot 120 is a second side wall 126 of the stator slot 120, and, the length of the cross section of the flat wire 132 is x, the width thereof is y, the linear distance between the ends of the two side walls facing the bottom wall 122 is n, the linear distance between the ends of the two side walls away from the bottom wall 122 is m, and along the radial direction of the stator core 110, the distance between the two ends of the side wall is h, and $0.25\times h\div m<x\div y<6\times h\div n$.

In the embodiment, the stator slot 120 is enclosed by the stator yoke 112 and two adjacent stator teeth 114, that is, the portion of the stator yoke 112 located between the two adjacent stator teeth 114 is the bottom wall 122 of the stator slot 120 between the two adjacent stator teeth 114, and the side wall of one stator tooth 114 is the first side wall 124 of the stator slot 120, and the side wall of the other stator tooth 114 is the second side wall 126 of the stator slot 120.

The length of the cross section of the flat wire 132 is x, the width of the cross section of the flat wire 132 is y, the linear distance between the ends of the two side walls facing the bottom wall 122 is n, the linear distance between the ends of the two side walls away from the bottom wall 122 is m, and along the radial direction of the stator core 110, the distance between the two ends of the side wall is h, and they satisfy $0.25\times h\div m<x\div y<6\times h\div n$, and furthermore, the cross-section of the stator slot 120 can be regarded as a trapezoid, and then the upper line, lower line, and height of the trapezoid are set and the relation between them and the length and the width of the flat wire 132 is defined, and the waste of internal space in the stator slot 120 can be minimized as much as possible, and the slot fill factor of the stator slot 120 can be improved as much as possible.

In the embodiment, the flat wires 132 are accommodated in the stator slot 120, and then, if the size of the flat wires 132 does not fit the size of the stator slot 120, it may render a waste of the internal space of the stator slot 120, and then the length-width ratio of the cross section of the flat wire 132, the height-upper line ratio of the stator slot 120, the height-lower line ratio of the stator slot 120 are limited, and this can further make both the number of the layers of the flat wires 132 and the number of a single layer of the flat wires 132 fit the stator slot 120, and avoid that too much space of the stator slot 120 is left and then the flat wires 132 can not be placed.

As shown in FIG. 2, FIG. 4, FIG. 5, FIG. 6, FIG. 7, FIG. 8, FIG. 9 and FIG. 10, based on any of the previous embodiments, furthermore, along the radial direction of the stator core 110, adjacent flat wires 132 fit each other.

In the embodiment, along the radial direction of the stator core 110, adjacent flat wires 132 fit each other, and then the distance between the flat wires 132 is zero, and thus the number of the flat wires 132 that the stator slot 120 can accommodate is increased, and the slot fill factor of the stator core 110 is improved.

In the embodiment, for the same layer of flat wires 132, adjacent flat wires 132 fit each other, and then, more wires can be accommodated in the same layer of flat wires 132, and this helps improve the slot fill factor.

As shown in FIG. 2, FIG. 4, FIG. 5, FIG. 6, FIG. 7, FIG. 8, FIG. 9 and FIG. 10, based on any of the previous embodiments, furthermore, along the radial direction of the stator core 110, adjacent flat wires 132 fit each other.

In the embodiment, along the radial direction of the stator core 110, adjacent flat wires 132 fit each other, and then the distance between the flat wires 132 is zero, and thus the number of the flat wires 132 that the stator slot 120 can accommodate is increased, and the slot fill factor of the stator core 110 is improved.

In the embodiment, the adjacent layers of flat wires 132 fit each other, and then the winding 130 can accommodate more layers of wires, and this helps improve the slot fill factor.

In addition, for the same layer of flat wires 132, the adjacent flat wires 132 fit each other, and the adjacent layers of the flat wires 132 fit each other, and the stator slot 120 can accommodate more wires, and this helps improve the slot fill factor.

As shown in FIG. 2, based on any of the previous embodiments, furthermore, the stator teeth 114 adopt trapezoid stator teeth. The trapezoid stator tooth indicates that the two faces of the stator tooth 114 facing different stator slots 120 have a certain angle therebetween.

Or, the stator tooth 114 adopts a parallel stator tooth. The parallel stator tooth indicates that the two faces of the stator tooth 114 facing different stator slots 120 are parallel to each other.

Furthermore, the shape of the stator tooth 114 can affect the slot shape of the stator slot 120.

As shown in FIG. 5, FIG. 8 and FIG. 9, based on any of the previous embodiments, furthermore, the stator yoke 112 faces one side of the stator teeth 114, and the portion between adjacent stator teeth 114 is the bottom wall 122 of the stator slot 120, the side of the stator teeth 114 at one side facing the stator slot 120 is a first side wall 124 of the stator slot 120, the side of the stator teeth 114 at the other side facing the stator slot 120 is a second side wall 126 of the stator slot 120, and the bottom wall 122 is a plane structure.

In the embodiment, the stator slot 120 is enclosed by the stator yoke 112 and two adjacent stator teeth 114, that is, the portion of the stator yoke 112 located between the two adjacent stator teeth 114 is the bottom wall 122 of the stator slot 120 between the two adjacent stator teeth 114, and the side wall of one stator tooth 114 is the first side wall 124 of the stator slot 120, and the side wall of the other stator tooth 114 is the second side wall 126 of the stator slot 120, and furthermore, the slot bottom of the stator teeth 114 can be a plane structure.

Furthermore, the angle between the bottom wall 122 and the first side wall 124 is β≥π÷2−π÷Z1, and Z1 is the number of the stator teeth 114. Likewise, the angle between the bottom wall 122 and the second side wall 126 is equal to β.

In the embodiment, the angle between the bottom wall 122 and the first side wall 124 is β≥π÷2−π÷Z1, and furthermore, a relatively large angle is formed between the bottom wall 122 and the first side wall 124 of the stator slot 120, and thus the area of the cross section of the stator slot 120 is improved, the number of the flat wires 132 that the stator slot 120 can accommodate is increased, and the efficiency of the motor is improved. It is taken as an example that the number of the stator teeth 114 is β≥π÷2−π÷12, i.e., β≥5π÷12, this further prevents an excessively small degree of β, and improves the capability of the stator slot 120 for accommodating the flat wires 132. Likewise, the angle between the bottom wall 122 and the second side wall 126 is equal to β, which has the same effect.

Figure 6:
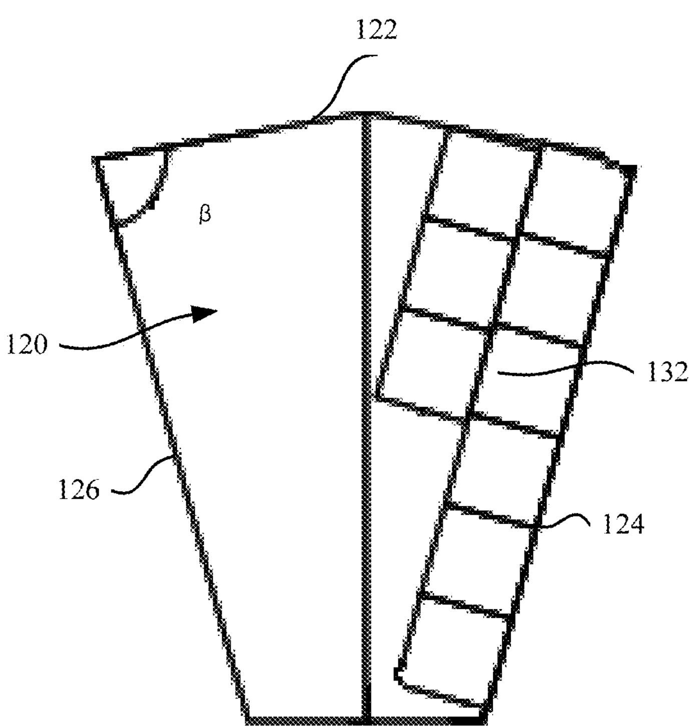
FIG. 6 is a schematic view of a part of the structure of the stator structure.

As shown in FIG. 6, based on any of the previous embodiments, furthermore, the stator yoke 112 faces one side of the stator teeth 114, and the portion between adjacent stator teeth 114 is the bottom wall 122 of the stator slot 120, the side of the stator teeth 114 at one side facing the stator slot 120 is a first side wall 124 of the stator slot 120, the side of the stator teeth 114 at the other side facing the stator slot 120 is a second side wall 126 of the stator slot 120, and the bottom wall 122 is a combination of a plurality of planes.

In the embodiment, the stator slot 120 is enclosed by the stator yoke 112 and two adjacent stator teeth 114, that is, the portion of the stator yoke 112 located between the two adjacent stator teeth 114 is the bottom wall 122 of the stator slot 120 between the two adjacent stator teeth 114, and the side wall of one stator tooth 114 is the first side wall 124 of the stator slot 120, and the side wall of the other stator tooth 114 is the second side wall 126 of the stator slot 120, and furthermore, the slot bottom can be a structure formed by the combination of a plurality of planes.

In the embodiment, the bottom wall 122 of the stator slot 120 is composed of two planes, the intersection of the two planes is at the bisection plane of the stator slot 120, and then, the stator slots 120 on both sides are axisymmetric based on the bisection plane of the stator slots 120.

Furthermore, the angle between the bottom wall 122 and the first side wall 124 is β≥π÷2−π÷Z1, and Z1 is the number of the stator teeth 114. Likewise, the angle between the bottom wall 122 and the second side wall 126 is equal to β.

In the embodiment, the angle between the bottom wall 122 and the first side wall 124 is β≥π÷2−π÷Z1, and furthermore, a relatively large angle is formed between the bottom wall 122 and the first side wall 124 of the stator slot 120, and thus the area of the cross section of the stator slot 120 is improved, the number of the flat wires 132 that the stator slot 120 can accommodate is increased, and the efficiency of the motor is improved. It is taken as an example that the number of the stator teeth 114 is β≥π÷2−π÷12, then β≥5π÷12, this further prevents an excessively small degree of β, and improves the capability of the stator slot 120 for accommodating the flat wires 132. Likewise, the angle between the bottom wall 122 and the second side wall 126 is equal to β, which has the same effect.

Figure 7:
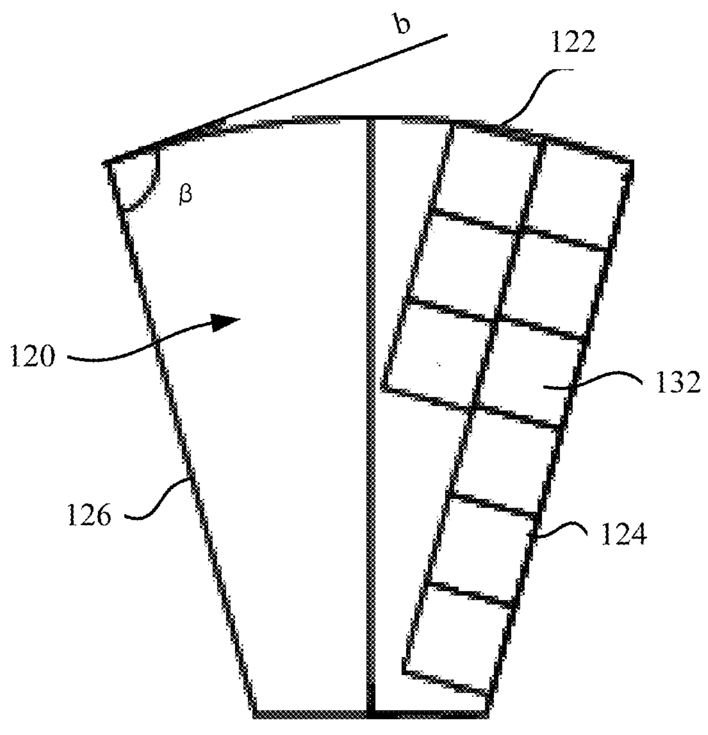
FIG. 7 is a schematic view of a part of the structure of the stator structure.

As shown in FIG. 7, based on any of the previous embodiments, furthermore, the stator yoke 112 faces one side of the stator teeth 114, and the portion between adjacent stator teeth 114 is the bottom wall 122 of the stator slot 120, the side of the stator teeth 114 at one side facing the stator slot 120 is a first side wall 124 of the stator slot 120, the side of the stator teeth 114 at the other side facing the stator slot 120 is a second side wall 126 of the stator slot 120, and the bottom wall 122 is a curved surface structure.

In the embodiment, the stator slot 120 is enclosed by the stator yoke 112 and two adjacent stator teeth 114, that is, the portion of the stator yoke 112 located between the two adjacent stator teeth 114 is the bottom wall 122 of the stator slot 120 between the two adjacent stator teeth 114, and the side wall of one stator tooth 114 is the first side wall 124 of the stator slot 120, and the side wall of the other stator tooth 114 is the second side wall 126 of the stator slot 120, and furthermore, the bottom wall 122 can be a curved surface structure.

Furthermore, the angle between the first side wall 124 and the tangent to the bottom wall 122 passing through any intersection of the bottom wall 122 and the first side wall 124 is β≥π÷2−π÷Z1, and Z1 is the number of the stator teeth 114. The angle between the second side wall 126 and the tangent to the bottom wall 122 passing through intersection of the bottom wall 122 and the second side wall 126 is equal to β.

In the embodiment, the angle between the first side wall 124 and the tangent to the bottom wall 122 passing through any intersection of the bottom wall 122 and the first side wall 124 is β≥π÷2−π÷Z1, and furthermore, a relatively large angle is formed between the bottom wall 122 and the first side wall 124 of the stator slot 120, and thus the area of the cross section of the stator slot 120 is improved, the number of the flat wires 132 that the stator slot 120 can accommodate is increased, and the efficiency of the motor is improved. It is taken as an example that the number of the stator teeth 114 is 12, β≥π÷2−π÷12, then β≥5π÷12, this further prevents an excessively small degree of J, and improves the capability of the stator slot 120 for accommodating the flat wires 132. Likewise, the angle between the second side wall 126 and the tangent to the bottom wall 122 passing through any intersection of the bottom wall 122 and the second side wall 126 is equal to β, which has the same effect.

Based on any of the previous embodiments, furthermore, the stator yoke 112 faces one side of the stator teeth 114, and the portion between adjacent stator teeth 114 is the bottom wall 122 of the stator slot 120, the side of the stator teeth 114 at one side facing the stator slot 120 is a first side wall 124 of the stator slot 120, the side of the stator teeth 114 at the other side facing the stator slot 120 is a second side wall 126 of the stator slot 120, and the bottom wall 122 is a structure of the combination of a plurality of curved surfaces.

In the embodiment, the stator slot 120 is enclosed by the stator yoke 112 and two adjacent stator teeth 114, that is, the portion of the stator yoke 112 located between the two adjacent stator teeth 114 is the bottom wall 122 of the stator slot 120 between the two adjacent stator teeth 114, and the side wall of one stator tooth 114 is the first side wall 124 of the stator slot 120, and the side wall of the other stator tooth 114 is the second side wall 126 of the stator slot 120, and furthermore, the bottom wall 122 can be a structure of the combination of a plurality of curved surfaces.

In the embodiment, the bottom wall 122 of the stator slot 120 is composed of two curved surfaces, the intersection of the two curved surfaces is at the bisection plane of the stator slot 120, and then, the stator slots 120 on both sides are axisymmetric based on the bisection plane of the stator slots 120.

Furthermore, the angle between the first side wall 124 and the tangent to the bottom wall 122 passing through any intersection of the bottom wall 122 and the first side wall 124 is $\beta \geq \pi \div 2 - \pi \div Z1$, and Z1 is the number of the stator teeth 114. The angle between the second side wall 126 and the tangent to the bottom wall 122 passing through any intersection of the bottom wall 122 and the second side wall 126 is equal to β.

In the embodiment, the angle between the first side wall 124 and the tangent to the bottom wall 122 passing through any intersection of the bottom wall 122 and the first side wall 124 is $\beta \geq \pi \div 2 - \pi \div Z1$, and furthermore, a relatively large angle is formed between the bottom wall 122 and the first side wall 124 of the stator slot 120, and thus the area of the cross section of the stator slot 120 is improved, the number of the flat wires 132 that the stator slot 120 can accommodate is increased, and the efficiency of the motor is improved. It is taken as an example that the number of the stator teeth 114 is $\beta \geq \pi \div 2 - \pi \div 12$, then $\beta \geq 5\pi \div 12$, this further prevents an excessively small degree of β, and improves the capability of the stator slot 120 for accommodating the flat wires 132. Likewise, the angle between the second side wall 126 and the tangent to the bottom wall 122 passing through any intersection of the bottom wall 122 and the second side wall 126 is equal to β, which has the same effect.

Based on any of the previous embodiments, furthermore, the stator yoke 112 faces one side of the stator teeth 114, and the portion between adjacent stator teeth 114 is the bottom wall 122 of the stator slot 120, the side of the stator teeth 114 at one side facing the stator slot 120 is a first side wall 124 of the stator slot 120, the side of the stator teeth 114 at the other side facing the stator slot 120 is a second side wall 126 of the stator slot 120, and the bottom wall 122 is a structure of the combination of a plurality of planes and curved surfaces.

In the embodiment, the stator slot 120 is enclosed by the stator yoke 112 and two adjacent stator teeth 114, that is, the portion of the stator yoke 112 located between the two adjacent stator teeth 114 is the bottom wall 122 of the stator slot 120 between the two adjacent stator teeth 114, and the side wall of one stator tooth 114 is the first side wall 124 of the stator slot 120, and the side wall of the other stator tooth 114 is the second side wall 126 of the stator slot 120, and furthermore, the bottom wall 122 can be a structure of the combination of a plurality of planes and curved surfaces.

Furthermore, if the bottom wall 122 connected to the first side wall 124 is a plane structure, it is applied that the angle between the bottom wall 122 and the first side wall 124 is $\beta \geq \pi \div 2 - \pi \div Z1$, and Z1 is the number of the stator teeth 114. Likewise, the bottom wall 122 connected to the second side wall 126 is also a plane structure, and the angle between the bottom wall 122 and the second side wall 126 is equal to β.

If the bottom wall 122 connected to the first side wall 124 is a curved surface structure, the angle between the first side wall 124 and the tangent to the bottom wall 122 passing through any intersection of the bottom wall 122 and the first side wall 124 $\beta \geq \pi \div 2 - \pi \div Z1$, and Z1 is the number of the stator teeth 114. Likewise, the bottom wall 122 connected to the second side wall 126 is also a curved surface structure, the angle between the second side wall 126 and the tangent to the bottom wall 122 passing through any intersection of the bottom wall 122 and the second side wall 126 is equal to β.

Figure 4:
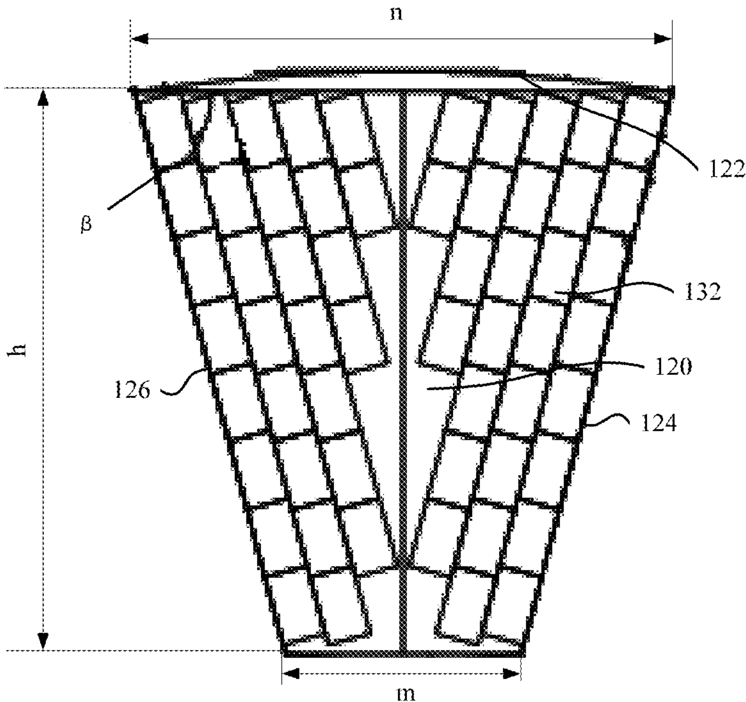
FIG. 4 is a schematic view of a part of the structure of the stator structure.

As shown in FIG. 2, FIG. 4 and FIG. 10, based on any of the previous embodiments, furthermore, the numbers of the flat wires 132 in different windings 130 within the same stator slot 120 are the same.

In the embodiment, one stator slot 120 needs to accommodate the windings 130 on two stator teeth 114, and furthermore, the numbers of the flat wires 132 in different windings 130 within the same stator slot 120 are the same, and one stator slot 120 can be divided equally by different windings 130, then the numbers of the flat wires 132 in each of the windings 130 are the same, and then the magnetic field formed by the stator structure 100 is more uniform, and the number of the flat wires 132 of each winding 130 can be maximized.

In the embodiment, the structures of the windings 130 on each of the stator teeth 114 are the same.

As shown in FIG. 2 and FIG. 10, based on any of the previous embodiments, furthermore, an insulation piece 140 is provided between the stator core 110 and the winding 130.

In the embodiment, the insulation piece 140 is provided between the stator core 110 and the winding 130, and the current is concentrated in the winding 130, and thus it is lessened that the stator core 110 absorbs current and then affects a magnetic field environment.

In the embodiment, the thickness of the insulation piece 140 is relatively small, and in actual applications, the insulation piece 140 may not be considered. Apparently, the thickness of the insulation piece 140 can also be taken into consideration, and then the parameter of the stator slot 120 is disposed to be slightly large.

Figure 3:
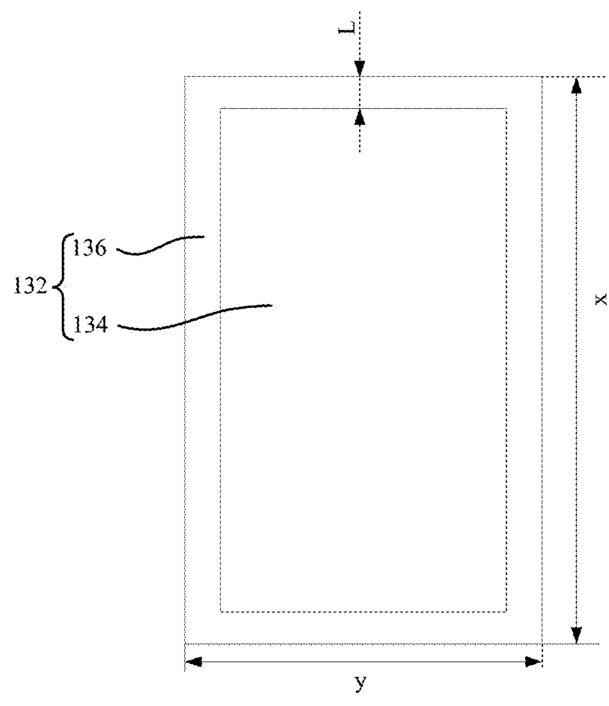
FIG. 3 is a schematic view of the structure of the cross section of a flat wire of the stator structure.

As shown in FIG. 3, based on any of the previous embodiments, furthermore, the flat wire 132 comprises a wire 134 and an insulation layer 136, and the insulation layer 136 is provided on the outside of the wire 134.

In the embodiment, the flat wire 132 comprises the wire 134 and the insulation layer 136 provided on the outside the of wire 134, the insulation layer 136 makes the flat wires 132 conduct electricity only in the direction of winding, and furthermore, this helps realize electromagnetic induction and improve the intensity of the magnetic field.

In the embodiment, the thickness of the insulation layers 136 around the wires 134 is uniform, and the thickness is L. The wires 134 can be copper wires or aluminum wires.

As shown in FIG. 2, one embodiment of the present disclosure provides a stator structure 100, and in the stator teeth 114, $t1=t2$. The number Z1 of the stator teeth 114 is equal to 12, i.e., $Z1=12$, while $\beta \div 2 - \pi \div Z1 = 5\pi \div 12$. Three layers of flat wires 132 are provided in the axial direction of the stator teeth 114, and each layer comprises q flat wires 132 ($q \geq 1$). The adjacent windings 130 fit each other along the radial direction, the number of the flat wires 132 in the circumferential direction away from the side of the stator teeth 114 is not more than the number of the flat wires 132 in the circumferential direction close to the side of the stator teeth 114.

As shown in FIG. 3, after adding the thickness L of the insulation layer 136 to the size of the wire 134 in flat wires 132, the length of the cross section of the flat wire 132 is x, the width of the cross section thereof is y. The actual slot fill factor of the wires 134 can reach 64.77%.

In the embodiment, as shown in FIG. 4, the winding 130 is a concentrated winding, the slot shape of the stator slot 120 is equivalent to a trapezoid, $Z1=12$, and then, $\beta \div \pi \div 2 - \pi \div Z1 = 5\pi \div 12$, and the parameters of the sizes of the trapezoid are respectively as follows: $m=5.01$, $n=11.46$, $h=12.03$, and the tooth body 116, the notch and the slot bottom have the insulation piece 140, the flat wires 132 are arranged neatly along respective portions of the insulation piece 140, and the total number of the arranged wires 134 is $N=23$.

As shown in FIG. 5, FIG. 6, and FIG. 7, one embodiment of the present disclosure provides a stator structure 100, and the slot shape of the stator slot 120 is equivalent to a trapezoid, and, $\beta1=5\pi\div12=\pi\div2-\pi\div Z1$, and the slot bottom is a sharp-angled trapezoid, $\beta2=4\pi\div9>\pi\div2-\pi\div Z1$.

When the slot bottom is a round bottom trapezoid, $\beta3=\pi\div2>\pi\div2-\pi\div Z1$. When the flat wire 132 adopts x=y=2 mm, then for both the formed sharp-angled trapezoid and the round bottom trapezoid, N=9, and they are larger than a flat-bottom trapezoid, in which N=8, and thus, the number of the turns can be improved.

As shown in FIG. 8, one embodiment of the present disclosure provides a stator structure 100, and its slot shape structure is the same with that of a previous embodiment in which t1=t2, the slot shape matches the winding 130, $\beta=\pi2-\pi Z1=5\pi\div12$, and the wires 134 adopts x=1.6 mm and y=1.03 mm.

Figure 11:
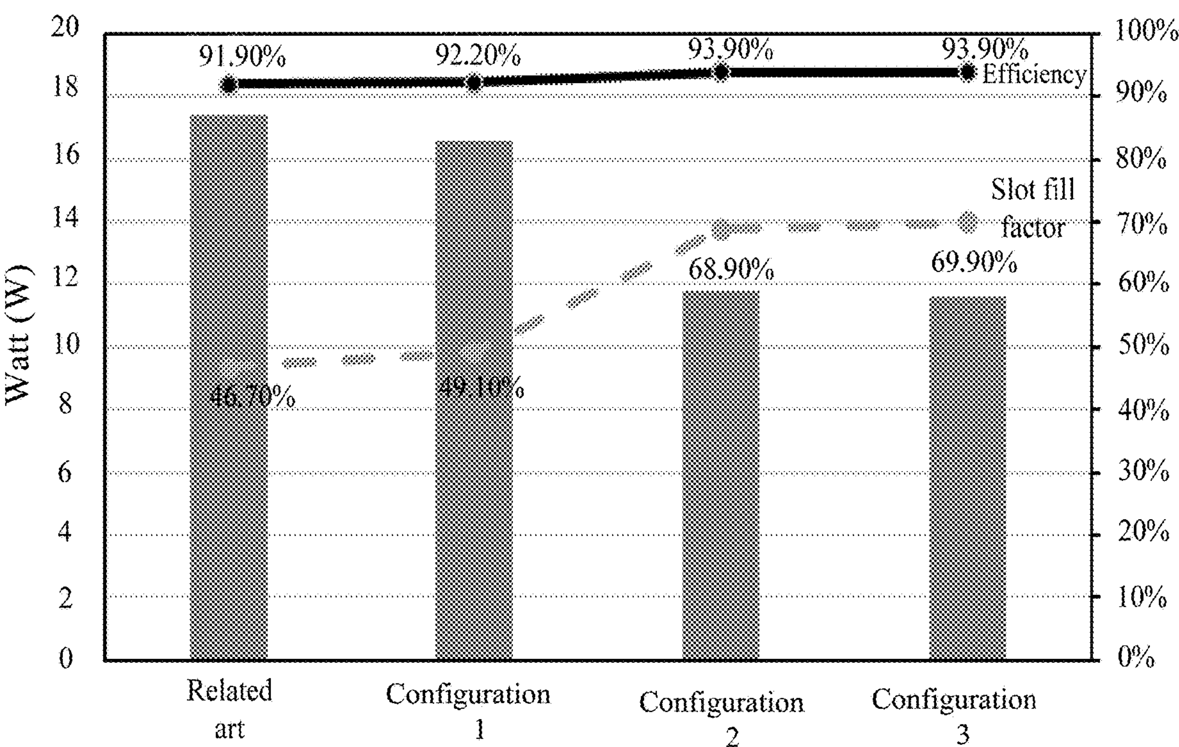
FIG. 11 is a comparison diagram of the slot fill factor, efficiency and copper loss of a motor using the stator structure provided by some embodiments of the present disclosure and a motor in the related art.

In FIG. 11, this embodiment is shown as Configuration 1. As shown in FIG. 11, in the same case that the number of turns is N=18, the related art adopts round wires; when the round wires are used to wind the winding in a concentrated manner, besides being unable to completely cover the stator slot 120, there are gaps among the round wires, and thus the actual slot fill factor of the copper conductor is not high, and is only 46.70%, the copper loss is close to 18 W, and the efficiency is 91.91%. In the case that the present embodiment adopts the flat wire 132, the slot fill factor reaches 49.10%, the copper loss is slightly higher than 16 W, and the efficiency is 92.20%, the slot fill factor of the motor rises, the copper loss is decreased, and the efficiency of the motor is improved by 0.3%.

The winding 130 has three layers of flat wires 132, the number of the flat wires 132 in the layer close to the stator teeth 114 to the number of the flat wires 132 in the layer away from the stator teeth 114 are successively 7, 6 and 5.

As shown in FIG. 9, one embodiment of the present disclosure provides a stator structure 100, and its slot shape structure is the same with that of a previous embodiment in which t1=t2, the slot shape matches the winding 130, $\beta=\pi2-\pi Z1=5\pi\div12$, and the conductor adopts x=2.9 mm and y=0.8 mm.

In FIG. 11, this embodiment is shown as Configuration 2. As shown in FIG. 11, in the same case that the number of turns is N=18, the related art adopts round wires; when the round wires are used to wind the winding 130 in a concentrated manner, besides being unable to completely cover the stator slot 120, there are gaps among the round wires, and thus the actual slot fill factor of the copper conductor is not high, and is only 46.70%, the copper loss is close to 18 W, and the efficiency is 91.91%. Based on previous embodiment, the present embodiment optimizes and improves the sizes of x and y of the flat wires 132, the slot fill factor reaches 68.90%, the copper loss is lower than 12 W, and the efficiency is 93.90%, the slot fill factor of the motor rises, the copper loss is further decreased, and the efficiency of the motor is improved by 2%.

The winding 130 has six layers of flat wires 132, the number of the flat wires 132 in the layer close to the stator teeth 114 to the number of the flat wires 132 in the layer away from the stator teeth 114 are successively 4, 4, 4, 3, 2 and 1.

In FIG. 10, this embodiment is shown as Configuration 3. As shown in FIG. 11, one embodiment of the present disclosure provides a stator structure 100, t1≠t2, the slot shape matches the winding 130, $\beta=\pi2-\pi Z1=5\pi\div12$, the stator tooth 114 in the embodiment adopts an unequal width structure, m=6.15 mm, n=10.40 mm, h=12.03 mm, t1=2.92 mm, t2=4.09 mm, and they satisfy the formula of $1.5\times t1\geq t2\geq t1$, the area of the slot is consistent with that of some previous embodiments, and x=1.49 mm and y=1.53 mm are adopted.

As shown in FIG. 11, in the same case that the number of turns is N=18, the related art adopts round wires; when the round wires are used to wind the winding 130 in a concentrated manner, besides being unable to completely cover the stator slot 120, there are gaps among the round wires, and thus the actual slot fill factor of the copper conductor is not high, and is only 46.70%, the copper loss is close to 18 W, and the efficiency is 91.91%. Based on the previous embodiment, the present embodiment adopts the stator tooth 114 having an unequal width structure, and the layers of the flat wires 132 are decreased to three layers, and this further helps the winding; the slot fill factor reaches 69.90%, the copper loss is lower than 12 W, and the efficiency is 93.90%, the slot fill factor of the motor rises, the copper loss is further decreased, and the efficiency of the motor is improved by about 2%.

The winding 130 has three layers of flat wires 132, and the number of the flat wires 132 in the layer close to the stator teeth 114 to the number of the flat wires 132 in the layer away from the stator teeth 114 are successively 8, 8 and 2.

The present disclosure provides a motor, comprising: a rotor structure; and the stator structure 100 provided in any of the above embodiments.

The motor provided by the present disclosure comprises the stator structure 100 provided in any of the above embodiments, and thus has all the beneficial effects of the stator structure 100 of any of the above embodiments, which are not stated herein one by one.

The present disclosure provides electrical equipment, comprising the motor provided in any of the above embodiments.

The electrical equipment provided by the present disclosure comprises the motor provided in any of the above embodiments, and thus has all the beneficial effects of the motor of any of the above embodiments, which are not stated here one by one.

In the present disclosure, the terms of "first", "second" and "third" are used only for the purpose of description and shall not be understood to indicate or imply any relative importance; the phrase of "a plurality of" indicates two or more, unless otherwise explicitly specified or defined. The terms of "mounting", "connected to", "connection", "fixing" and the like should be understood in a broad sense, unless otherwise clearly defined, for example, "connection" may be a fixed connection, and may also be a removable connection, or an integral connection; and "connected to" may be a direct connection and may also be an indirect connection through an intermediate medium. A person of ordinary skills in the art could understand the specific meanings of the terms in the present disclosure according to specific situations.

In the specification of the present disclosure, it is understandable that the orientation or position relations indicated by the terms of "upper", "lower", "left", "right", "front", "rear" and the like are based on the orientation or position relations shown in the accompanying drawings, and they are just intended to conveniently describe the present application and simplify the description, and are not intended to indicate or imply that the devices or units as indicated should have specific orientations or should be configured or operated in specific orientations, and then should not be construed as limitations to the present application.

In the description of the present specification, the descriptions of the phrases "one embodiment", "some embodiments" and "specific embodiments" and the like mean that the specific features, structures, materials or characteristics described in combination with the embodiment(s) or example(s) are included in at least one embodiment or example of the present disclosure. In the specification, the schematic representation of the above phrases does not necessarily refer to the same embodiment or example. Moreover, the particular features, structures, materials or characteristics described may be combined in a suitable manner in any one or more of the embodiments or examples.

The descriptions above are only some embodiments of the present disclosure, and are not used to limit the present disclosure. For a person skilled in the art, the present disclosure may have various changes and variations. Any modifications, equivalent substitutions, improvements, etc. made within the spirit and principle of the present disclosure shall all be included in the protection scope of the present disclosure.

What is claimed is:

1. A stator structure comprising:

a stator core, wherein the stator core comprises a stator yoke and a plurality of stator teeth, the plurality of stator teeth are arranged on the stator yoke, a stator slot is formed between each two adjacent stator teeth, each stator tooth comprises a tooth body and a tooth boot, the tooth body is arranged on the stator yoke, and the tooth boot is arranged on the tooth body; and a winding arranged on the plurality of stator teeth, wherein the winding comprises flat wires wound on the plurality of stator teeth in a concentrated manner, the flat wires are wound on the plurality of stator teeth in multiple layers, and the number of flat wires in the layer of the winding away from the plurality of stator teeth is not more than the number of flat wires in the layer of the winding close to the plurality of stator teeth, wherein a width of the side of the tooth body close to the tooth boot is $2\times t1$, a width of the side of the tooth body close to the stator yoke is $2\times t2$, and $1.5\times t1\geq t2\geq t1$;

the stator yoke faces one side of the stator teeth, and a portion between the adjacent stator teeth is a bottom wall of the stator slot, a side of the stator teeth facing the stator slot is a side wall of the stator slot;

a length of the cross section of the flat wire is x, a width thereof is y, the linear distance between the ends of two side walls facing the bottom wall is n, a linear distance between the ends of the two side walls away from the bottom wall is m, and along the radial direction of the stator core, a distance between the two ends of the side wall is h, wherein $0.25\times h\div m<x\div y<6\times h\div n$; and the bottom wall is a plane, and an angle between the bottom wall and the side wall is $\beta\geq\pi\div2-\pi\div Z1$, wherein Z1 is the number of the stator teeth.

2. The stator structure according to claim 1, wherein along the radial direction of the stator core, adjacent flat wires fit each other.

3. The stator structure according to claim 1, wherein along the circumferential direction of the stator core, adjacent flat wires fit each other.

4. The stator structure according to claim 1, wherein the stator tooth is a trapezoid stator tooth or a parallel stator tooth.

5. The stator structure according to claim 1, wherein the numbers of the flat wires in different windings within the same stator slot are the same.

6. The stator structure according to claim 1, wherein an insulation piece is provided between the stator core and the winding.

7. The stator structure according to claim 1, wherein the flat wire comprises:

a wire; and an insulation layer provided on the outside of the wire.

8. A motor comprising:

a rotor structure; and the stator structure according to claim 1.

9. Electrical equipment comprising the motor according to claim 8.

10. A stator structure comprising:

a stator core, wherein the stator core comprises a stator yoke and a plurality of stator teeth, the plurality of stator teeth are arranged on the stator yoke, a stator slot is formed between each two adjacent stator teeth, each stator tooth comprises a tooth body and a tooth boot, the tooth body is arranged on the stator yoke, and the tooth boot is arranged on the tooth body; and a winding arranged on the plurality of stator teeth, wherein the winding comprises flat wires wound on the plurality of stator teeth in a concentrated manner, the flat wires are wound on the plurality of stator teeth in multiple layers, and the number of flat wires in the layer of the winding away from the plurality of stator teeth is not more than the number of flat wires in the layer of the winding close to the plurality of stator teeth, wherein:

the width of the side of the tooth body close to the tooth boot is $2\times t1$, the width of the side of the tooth body close to the stator yoke is $2\times t2$, and $1.5\times t1\geq t2\geq t1$;

the stator yoke faces one side of the stator teeth, and a portion between the adjacent stator teeth is a bottom wall of the stator slot, a side of the stator teeth facing the stator slot is a side wall of the stator slot;

a length of the cross section of the flat wire is x, a width thereof is y, the linear distance between the ends of two side walls facing the bottom wall is n, a linear distance between the ends of the two side walls away from the bottom wall is m, and along the radial direction of the stator core, a distance between the two ends of the side wall is h, wherein $0.25\times h\div m<x\div y<6\times h\div n$; and the bottom wall is a curved surface, and an angle between the side wall and the tangent to the bottom wall passing through any intersection of the bottom wall and the side wall is $\beta\geq\pi\div2-\pi\div Z1$, wherein Z1 is the number of the stator teeth.

11. The stator structure according to claim 10, wherein along the radial direction of the stator core, adjacent flat wires fit each other.

12. The stator structure according to claim 10, wherein along the circumferential direction of the stator core, adjacent flat wires fit each other.

13. The stator structure according to claim 10, wherein the stator tooth is a trapezoid stator tooth or a parallel stator tooth.

14. The stator structure according to claim 10, wherein the numbers of the flat wires in different windings within the same stator slot are the same.

15. The stator structure according to claim 10, wherein an insulation piece is provided between the stator core and the winding.

16. The stator structure according to claim 10, wherein the flat wire comprises:

a wire; and an insulation layer provided on the outside of the wire.

17. A motor comprising:

a rotor structure; and the stator structure according to claim 10.

18. Electrical equipment comprising the motor according to claim 17.

* * * * *